(12) United States Patent
Descutner et al.

(10) Patent No.: US 7,712,790 B2
(45) Date of Patent: May 11, 2010

(54) TANK ADAPTER

(75) Inventors: David A. Descutner, McDonald, PA (US); Eric J. Waldo, Pittsburgh, PA (US)

(73) Assignee: Atlantis Technologies LLC, Oakdale, PA (US)

( * ) Notice: Subject to any disclaimer, the term of this patent is extended or adjusted under 35 U.S.C. 154(b) by 476 days.

(21) Appl. No.: 11/649,400

(22) Filed: Jan. 4, 2007

(65) Prior Publication Data

US 2008/0164435 A1   Jul. 10, 2008

(51) Int. Cl.
*F16L 41/00* (2006.01)
(52) U.S. Cl. .................. 285/206; 285/139.1; 285/192; 285/205
(58) Field of Classification Search .............. 285/139.1, 285/139.2, 142.1, 192, 205–206
See application file for complete search history.

(56) References Cited

U.S. PATENT DOCUMENTS

| | | | | |
|---|---|---|---|---|
| 456,367 | A * | 7/1891 | Murray | ................... 137/614.2 |
| 591,431 | A * | 10/1897 | Smith | ...................... 285/139.2 |
| 1,623,587 | A * | 4/1927 | Frederickson | .............. 220/3.94 |
| 1,862,515 | A * | 6/1932 | Gray | ........................ 285/192 |
| 4,850,617 | A | 7/1989 | Moberly | |
| 5,042,776 | A | 8/1991 | Chronister | |
| 5,961,155 | A * | 10/1999 | Youngs | ................... 285/139.1 |
| 6,059,321 | A | 5/2000 | Lyall, III | |
| 6,079,751 | A * | 6/2000 | Youngs | ................... 285/139.1 |
| 6,183,021 | B1 | 2/2001 | Walsh et al. | |
| 6,612,620 | B1 * | 9/2003 | Nordstrom et al. | ........ 285/139.1 |
| 6,769,698 | B2 | 8/2004 | Kamiya et al. | |
| 6,889,948 | B2 | 5/2005 | Melancon et al. | |
| 7,052,048 | B2 | 5/2006 | Murphy | |
| 7,121,589 | B2 | 10/2006 | Hawkinson et al. | |

* cited by examiner

*Primary Examiner*—Aaron M Dunwoody
*Assistant Examiner*—Fannie Kee
(74) *Attorney, Agent, or Firm*—Buchanan Ingersoll & Rooney PC; Craig G. Cochenour; Ralph G. Fischer

(57) ABSTRACT

A tank adapter has a housing. The housing has a top, a bottom and a sidewall disposed between the top and the bottom and a cavity defined by the top, bottom, and sidewall. The outer surface of the top has a first lower surface and a second raised upper surface. The second raised upper surface is located in juxtaposition to the first lower surface. The perimeter of the first lower surface is larger than the perimeter of the second raised upper surface such that a lip is formed between the first lower surface and the second raised upper surface. At least one passageway extends from the second raised upper surface to the inner surface of the top. The passageway has a first opening located in operative communication with the second raised upper surface. The passageway has a second opening located in operative communication with the inner surface of the top and at least a portion of the cavity.

14 Claims, 19 Drawing Sheets

TANK ADAPTER

FIELD OF INVENTION

A tank adapter is provided that relates generally to fittings and, more particularly, to tank and vessel fittings.

BACKGROUND OF THE INVENTION

Tank adapters, such as donker bolts, are often used to connect external objects, such as ladders or control panels, to the sidewall of a tank or vessel. Other types of tank adapters, such as bolted tank flanges, may be installed into a tank sidewall to provide an access point through which chemicals, fluids, or other substances being retained within the tank can pass through for use in a fabrication process or a chemical manufacturing process. These tank adapters are attached to a tank wall by tightening nuts on the bolts that pass through holes in the tank wall. The tank adapter must be tightly held to the tank wall to avoid leaks of materials retained within the tank.

Donker bolts and bolted tank flanges, however, are often difficult to install. For example, these tank adapters are often over compressed when installed such that the gasket of the tank adapter is deformed and leaks. Such over compression is often undected until after the tank is filled with material. Consequently, the replacement of the deformed gasket is normally a time consuming, expensive and, depending upon the material being retained by the tank, also dangerous task because the leaking material must be removed from the tank prior to replacing the deformed gasket. This increases the cost and time associated with installing tank adapters.

Additionally, there is often a problem that occurs when the tank adapter's connection to the tank wall has loosened and a leak results. Typically, when tank adapters begin to have a loose fit, the tank adapter bolts are corroded by the substances retained by the tank before the tank begins to leak. Often, there is a delay between when the leak occurs and when the leak is later identified. Such a delay can provide time for the bolts to be completely destroyed and cause major leaks that result from the tank adapter being released by the bolts attaching the tank adapter to the tank or vessel wall.

Consequently, there is a great need for tank adapters that control the compression between the tank adapter and the tank wall to prevent over compression. Such a tank adapter should also make detecting small leaks possible so that corrective action can be taken before a major leak occurs.

SUMMARY OF THE INVENTION

We provide a tank adapter that has a housing that has a top, a bottom and a sidewall deposed between the top and the bottom. The top, bottom, and sidewall form a cavity within the housing. The shape and size of the cavity is defined by the inner surfaces of the top, bottom, and sidewall. The outer surface of the top has a first lower surface and a second raised upper surface. The second raised upper surface is located in juxtaposition to the first lower surface. The perimeter of the first lower surface is larger in size in relationship to the perimeter of the second raised upper surface such that a lip is formed between the first lower surface and the second raised upper surface. At least one passageway extends from the second raised upper surface to the inner surface of the top. The passageway has a first opening located in operative communication with the second raised upper surface. The passageway has a second opening located in operative communication with the inner surface of the top and at least a portion of the cavity. Thus, the first opening and second opening of the passageway are located on opposite ends of the passageway such that the passageway is continuous from the outer surface of the top to the cavity.

In another embodiment, the tank adapter can also have at least one fastener. The fastener has a first end, a second end, and a middle section deposed between the first and second ends of the fastener. The middle section of the fastener extends through the passageway and through the first opening of the passageway such that the second end of the fastener protrudes beyond the second raised upper surface of the top of the housing. The first end of the fastener is adjacent the inner surface of the top.

In yet another embodiment, an element can be located in the cavity of the housing. The element has at least one hole and is housed within the cavity in juxtaposition with the inner surface of the top of the housing. The hole of the element is aligned with the second opening of the passageway. The first end of the fastener is in juxtaposition with the element such that the middle section of the fastener extends through the hole of the element and through the passageway such that the second end of the fastener protrudes beyond the second raised upper surface of the outer surface of the top of the housing. The element is preferably made of stainless steel, but can be made of other materials, such as for example but not limited to, metals, alloys, ceramics, or plastics. The element is most preferably made of grade 304 stainless steel.

In another embodiment, the inner surface of the top of the housing and the inner surface of the sidewall of the housing may define a polygonal shape or a substantially polygonal shape. An element located within the cavity of such embodiments has a shape that allows for an interlocking fit with the polygonal or substantially polygonal shape of the inner surface of the housing.

In yet another embodiment, the tank adapter can also have at least one nut that is connected to the fastener.

In another embodiment, the tank adapter can include a body having at least one hole. The middle section of the fastener extends through the hole of the body so that the body is aligned with at least a portion of the outer surface of the top of the housing.

In another embodiment, the tank adapter can also have at least one compressible resilient member in juxtaposition to said lip. The compressible resilient member has at least one sidewall that has a height that extends above the second raised upper surface.

In another embodiment, the outer surface of the top of the housing may also have a third wall that is in juxtaposition with the first lower surface of the outer surface of the top. The third wall has a perimeter that is greater in size in relationship to the perimeter of the second raised upper surface and extends above the first lower surface such that the lip, the first lower surface, and the third wall define a groove, the first lower surface being the bottom of the groove. The lip and the third wall being the sidewalls of the groove. The compressible resilient member is in juxtaposition with the first lower surface, the third wall and the lip. The compressible resilient member also has at least one sidewall that has a height that extends above the third wall.

The compressible resilient member can be made of other materials, such as for example but not limited to other plastics, rubbers, silicone rubbers, foams, and elastics. Preferably, the compressible resilient member is coated with polytetrafluoroethylene.

In yet another embodiment, the housing can also have a channel. The channel has a wall, a first opening at a first end of the channel, a second opening at a second end of the channel, and a middle section disposed between the first and second openings of the channel. The wall of the channel has an inner side and an outer side. The inner side of the wall of the channel defines the first end, middle section, and second end of the channel. The first opening and first end of the channel are located above the second raised upper surface of the top of the housing. The middle section of the channel extends from the first end of the channel through the top of the housing, the cavity of the housing, the inner surface of the bottom of the housing and the outer surface of the bottom of the housing to the second end of the channel. The second end of the channel either (a) terminates with the second opening of the channel through the outer surface of the bottom of the housing or (b) extends beyond the outer surface of the bottom of the housing. A first portion of the outer side of the wall of the channel extends from the first end of the channel to the inner surface of the top of the housing. A second portion of the outer side of the wall of the channel extends from the inner surface of the top of the housing to the inner surface of the bottom of the housing so that the second portion of the outer side of the wall of the channel, the inner surface of the sidewall of the housing, the inner surface of the top and the inner surface of the bottom define the cavity of the housing.

In another embodiment, the channel can have at least one furrow in the inner side or the outer side of the wall of the channel so that tubes, pipes, or other fittings may be coupled to the channel. In yet another embodiment, at least one coupling device can also be attached adjacent to the first end of the channel or the second end of the channel so that other fittings, tubes, or pipes can be connected to the channel. In another embodiment, both the first end of the channel and the second end of the channel are attached to coupling devices.

The bottom of the housing can be in sealed engagement with the sidewall of the housing. For embodiments that incorporate at least one channel, the bottom of the housing can also be in sealed engagement with the outer wall of the channel adjacent the second opening of the channel.

BRIEF DESCRIPTION OF THE DRAWINGS

In the accompanying drawings we have shown certain present preferred embodiments of the invention and have illustrated certain present preferred methods of practicing the same.

in FIG. 7.

DETAILED DESCRIPTION OF PREFERRED EMBODIMENTS

Figure 1:
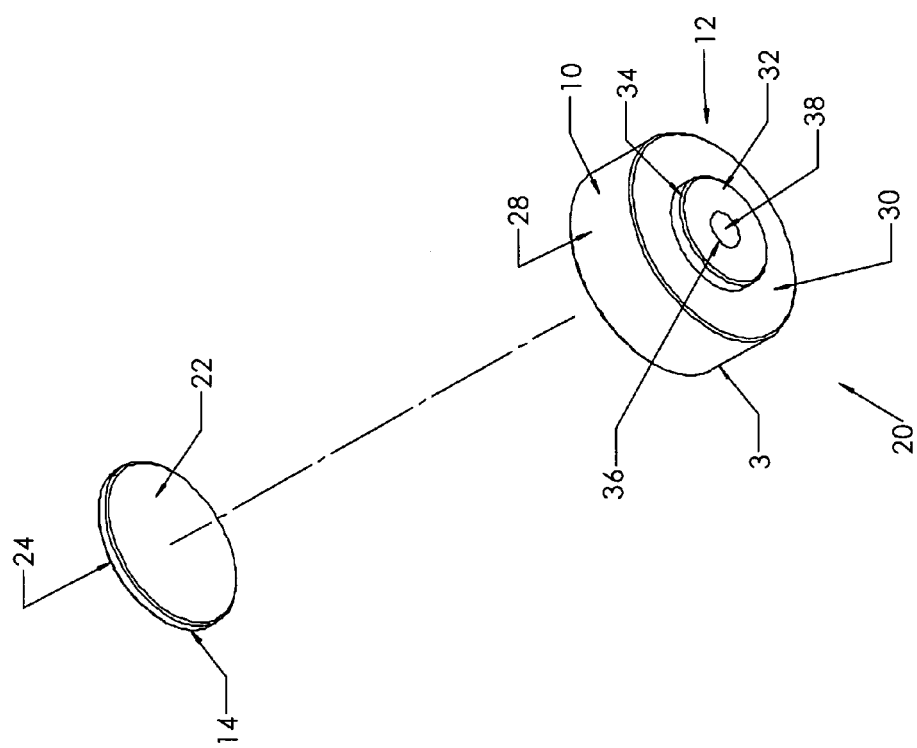
FIG. 1 is an exploded view of a first present preferred embodiment.
Figure 8:
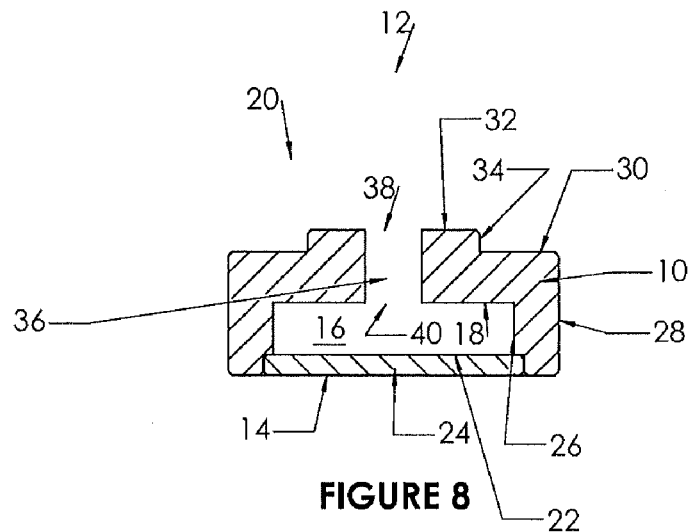
FIG. 8 is a sectional view of the first present preferred embodiment taken along line VII-VII.
Figure 7:
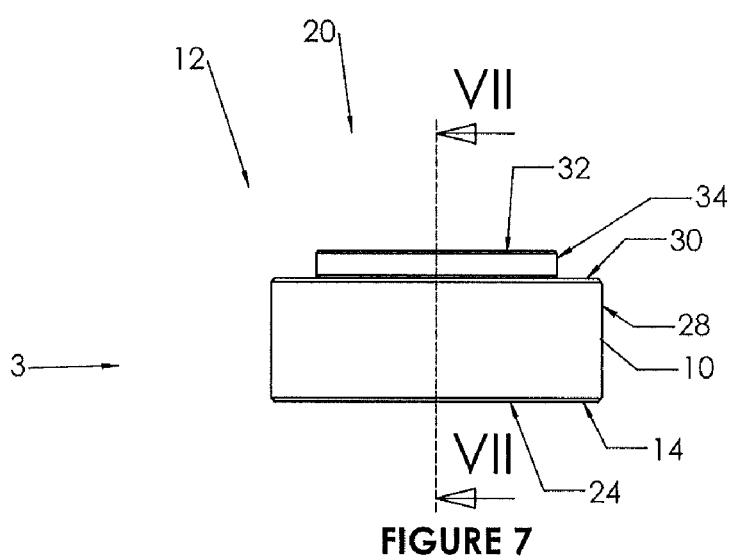
FIG. 7 is a side view of the first present preferred embodiment.

Referring to FIGS. 1, 7 and 8, the first present preferred embodiment of the tank adapter device of this invention has a housing 3 that has a sidewall 10, a top 12, a bottom 14, and a cavity 16. The bottom has an inner surface 22 and an outer surface 24. The sidewall has an inner surface 26 and an outer surface 28. The top has an inner surface 18 and an outer surface 20. The outer surface 20 of the top has a first lower surface 30 and a second raised upper surface 32 such that a lip 34 is formed between the first lower surface 30 and the second raised upper surface 32. As best seen in FIG. 7, the cavity 16 of the housing 3 is defined by the inner surface 26 of the sidewall, the inner surface 22 of the bottom, and the inner surface 18 of the top. The housing also has at least one passageway 36. The passageway has a first opening 38 that is in operative communication with the second raised upper surface 32 of the top and a second opening 40 that is in operative communication with the cavity.

As the description of the tank adapter device of this invention proceeds, common aspects of each present preferred embodiment of the invention may be identified with the same reference characters. For example, reference character 16 will refer generally to the cavity of each embodiment and reference character 3 will refer to the housing of each embodiment.

Figure 2:
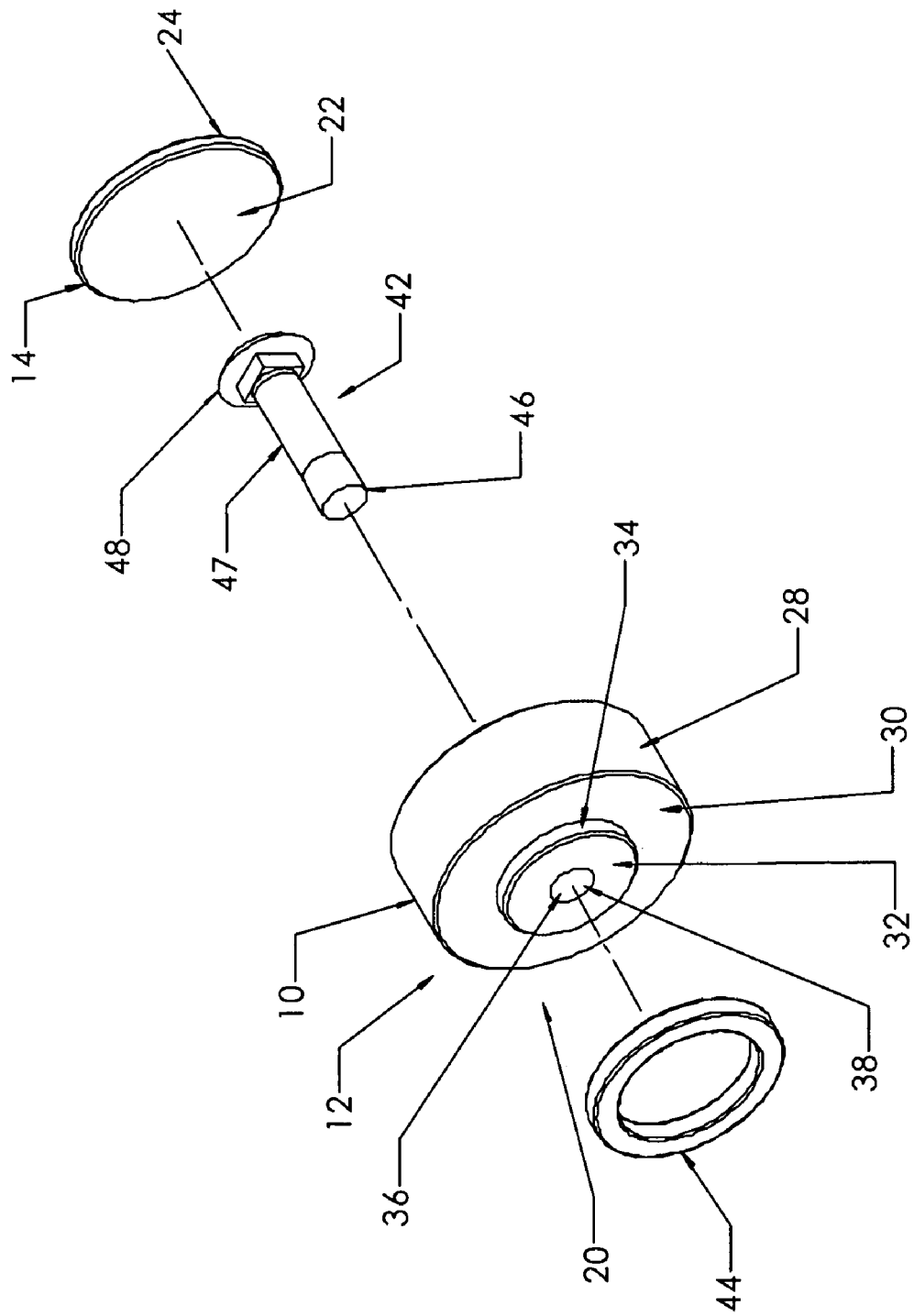
FIG. 2 is an exploded view of a second present preferred embodiment.

Referring to FIG. 2, at least one fastener 42 can also be provided. The fastener has a first end 48, a middle section 47, and a second end 46. The first end 48 of the fastener fits within the cavity 16 of the housing. The first end 48 of the fastener is adjacent to the inner surface 18 of the top. The middle section 47 of the fastener extends through the second end of a passageway 40, through the passageway 36, and out the first opening of the passageway 38 such that the second end of the fastener 46 protrudes above the second raised upper surface 32.

At least one compressible resilient member 44, also known as a gasket to those skilled in the art, may also be provided. The compressible resilient member is positioned on the first lower surface 30 such that the compressible resilient member 44 is adjacent, or in juxtaposition with, the lip 34. Of course, more than one compressible resilient member may be located adjacent to the lip. For example, in an alternative embodiment, two compressible resilient members may be located on the first lower surface. We prefer, however, to use only one compressible resilient member.

It should be understood that at least one sidewall of the compressible resilient member extends above the outer surface of the top of the housing so that when the housing is installed in a tank or vessel wall the compressible resilient member will be compressed. As the compressible resilient member is compressed, the housing will get closer to the tank wall. The housing, however, is sufficiently hard so that the compressible resilient member cannot be compressed below the height of the top of the housing. As a result, the hardness of the housing prevents nuts or other devices tightened on fasteners that extend from the cavity of the housing to be over tightened such that the compressible resilient member is deformed during the installation of the housing to a tank wall. Consequently, the location, configuration, and hardness of the outer surface of the top of the housing prevents the compressible resilient member from being over compressed during installation.

Rubbers, elastics, foams, and other materials may be used for the compressible resilient member. The compressible resilient member is preferably made of an elastic, such as silicone rubber or rubber. The material chosen for making up the resilient member is preferably a material that will not react with materials retained within, a tank or vessel. In an alternative embodiment, the compressible resilient member may be encapsulated in an inert plastic, such as polytetrafluoroethylene, to ensure that the compressible resilient member does not react with materials stored in the tank or vessel.

Figure 3:
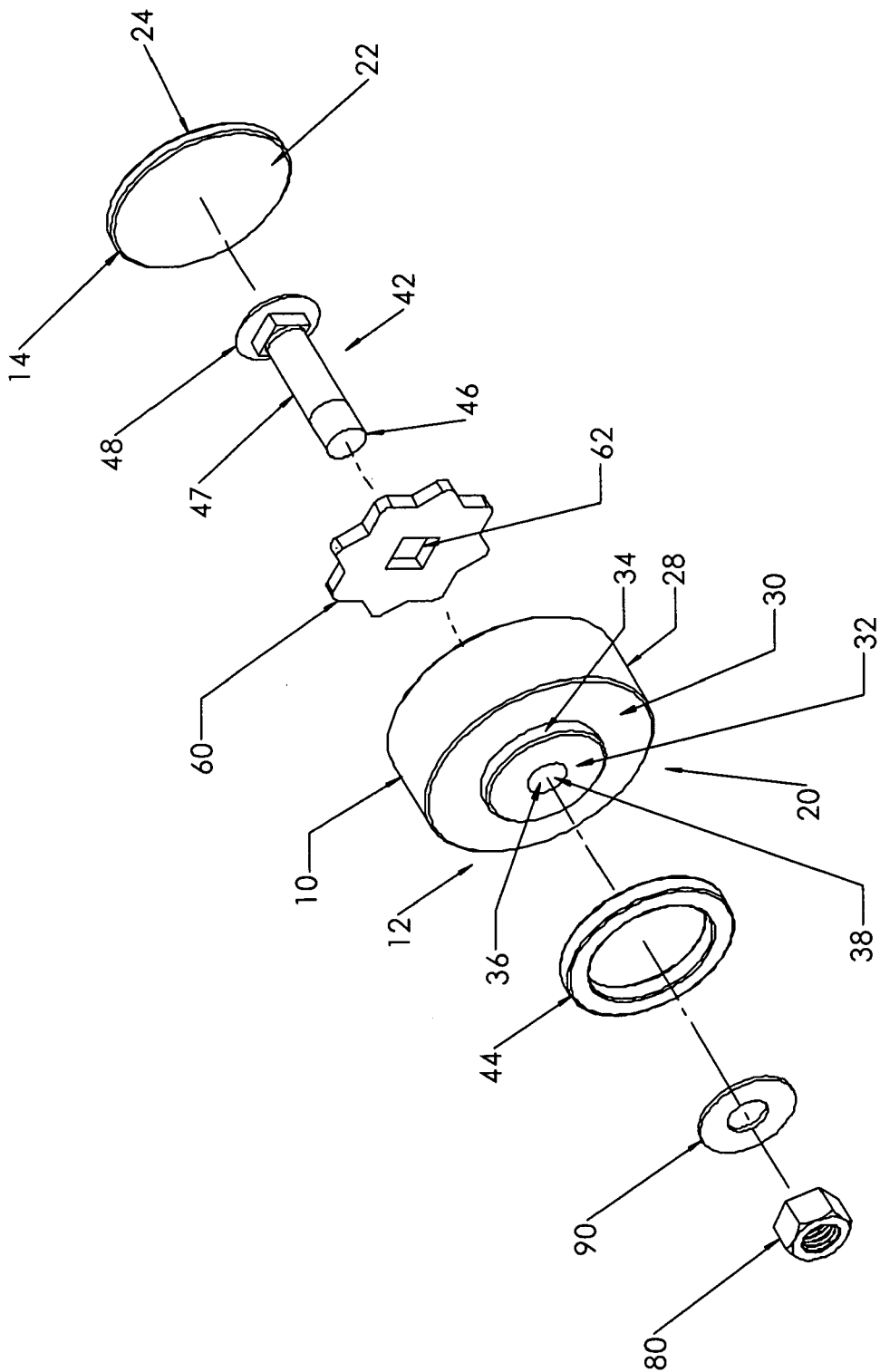
FIG. 3 is an exploded view of a third present preferred embodiment.
Figure 4:
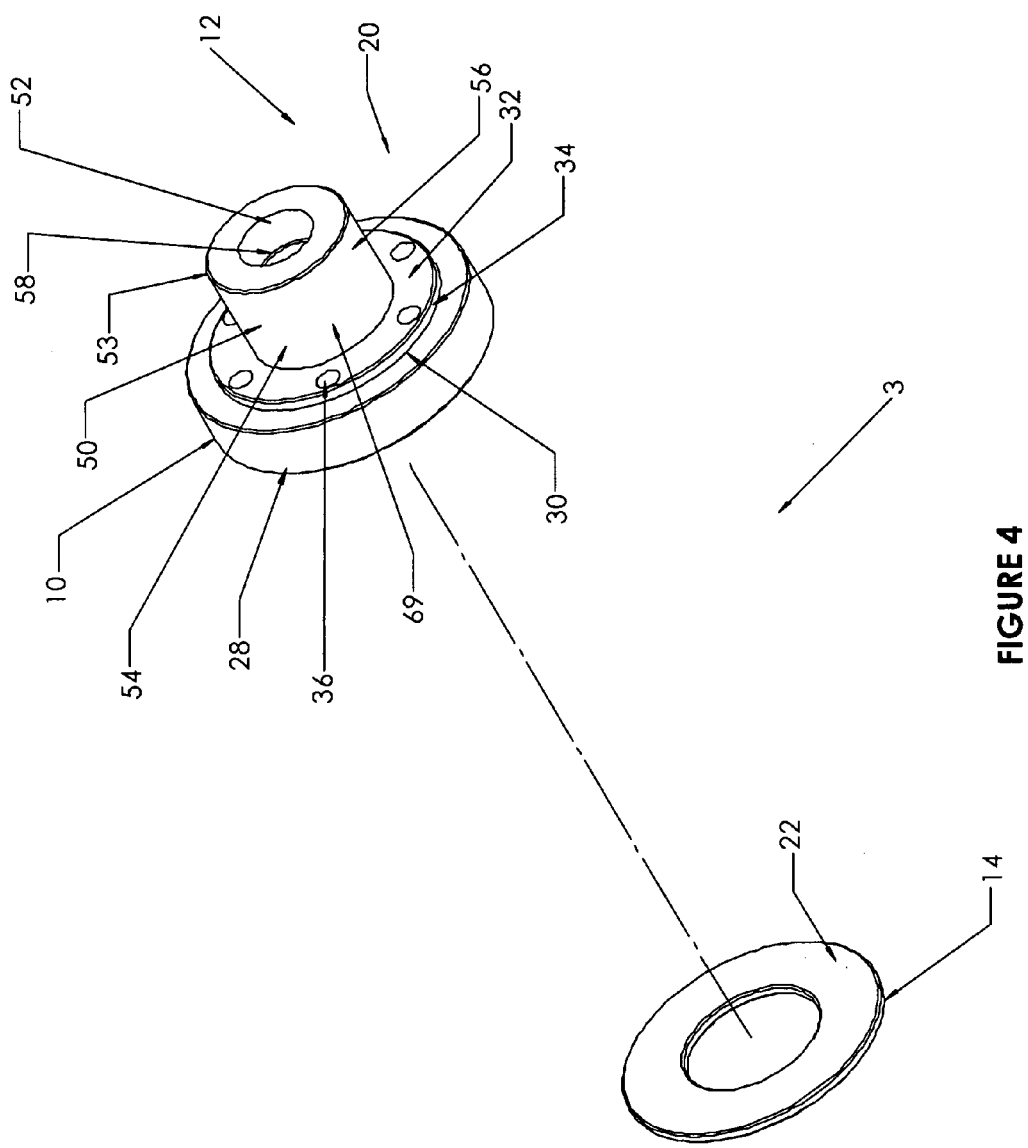
FIG. 4 is an exploded view of a fourth present preferred embodiment.
Figure 5:
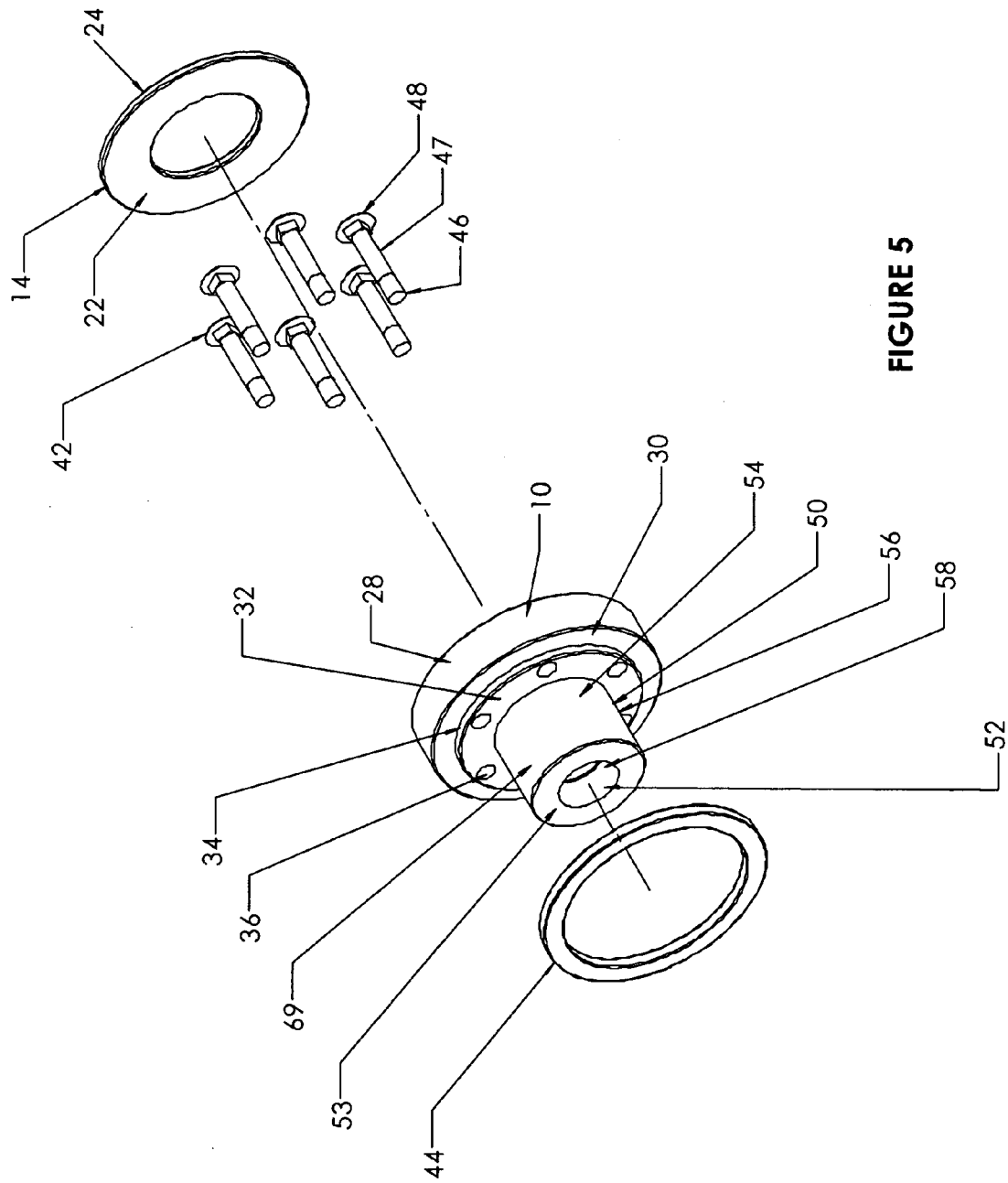
FIG. 5 is an exploded view of a fifth present preferred embodiment.

In a third present preferred embodiment, as shown in FIG. 3, an element 60 can provide increased durability. The element 60 has at least one hole 62 that is sized to permit the middle section 47 of the fastener to pass through the hole 62. When the element 60 is housed located within the cavity 16 of the housing, the element 60 is in juxtaposition with the inner surface 18 of the top such that the hole 62 is aligned with the second opening 40 of the passageway. The first end 48 of the fastener is housed within the cavity 16 such that the first end of the fastener is in juxtaposition with the element 60. The middle section 47 of the fastener extends through hole 62 of the element 60 and passageway 36 such that the second end 46 of the fastener extends above the second raised upper surface 32 of the outer surface of the top of the housing.

Figure 9:
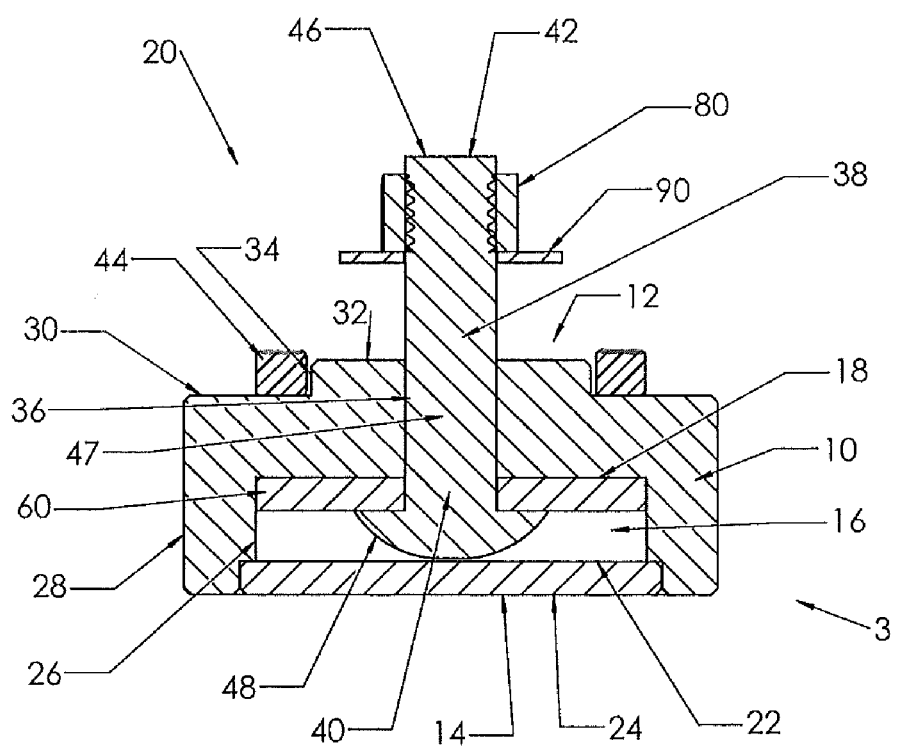
FIG. 9 is a sectional view, similar to FIG. 8, of the third present preferred embodiment.
Figure 10:
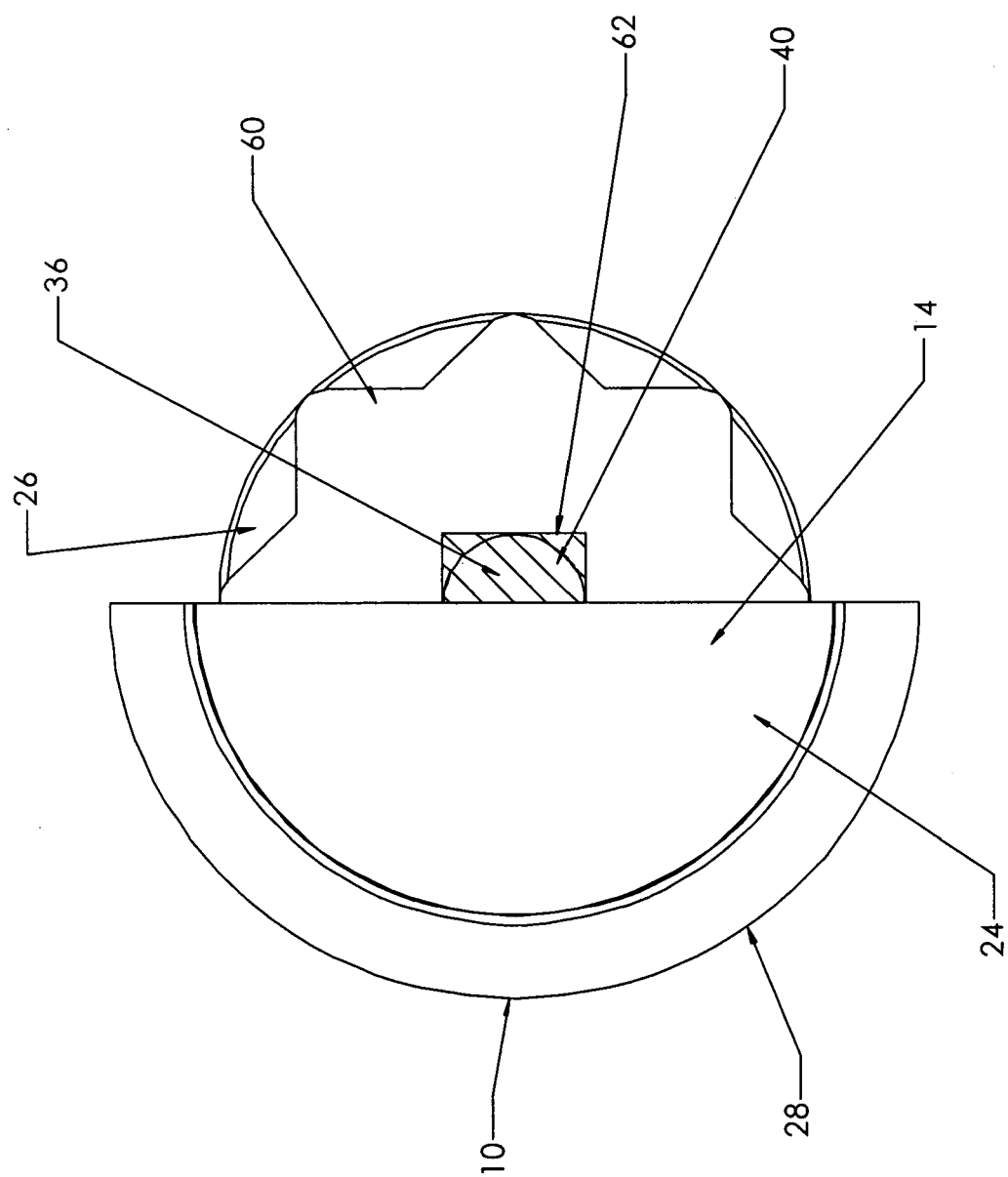
FIG. 10 is a back view of the third present preferred embodiment with a portion of the bottom of the housing, a portion of the sidewall and the fastener cut away.
Figure 11:
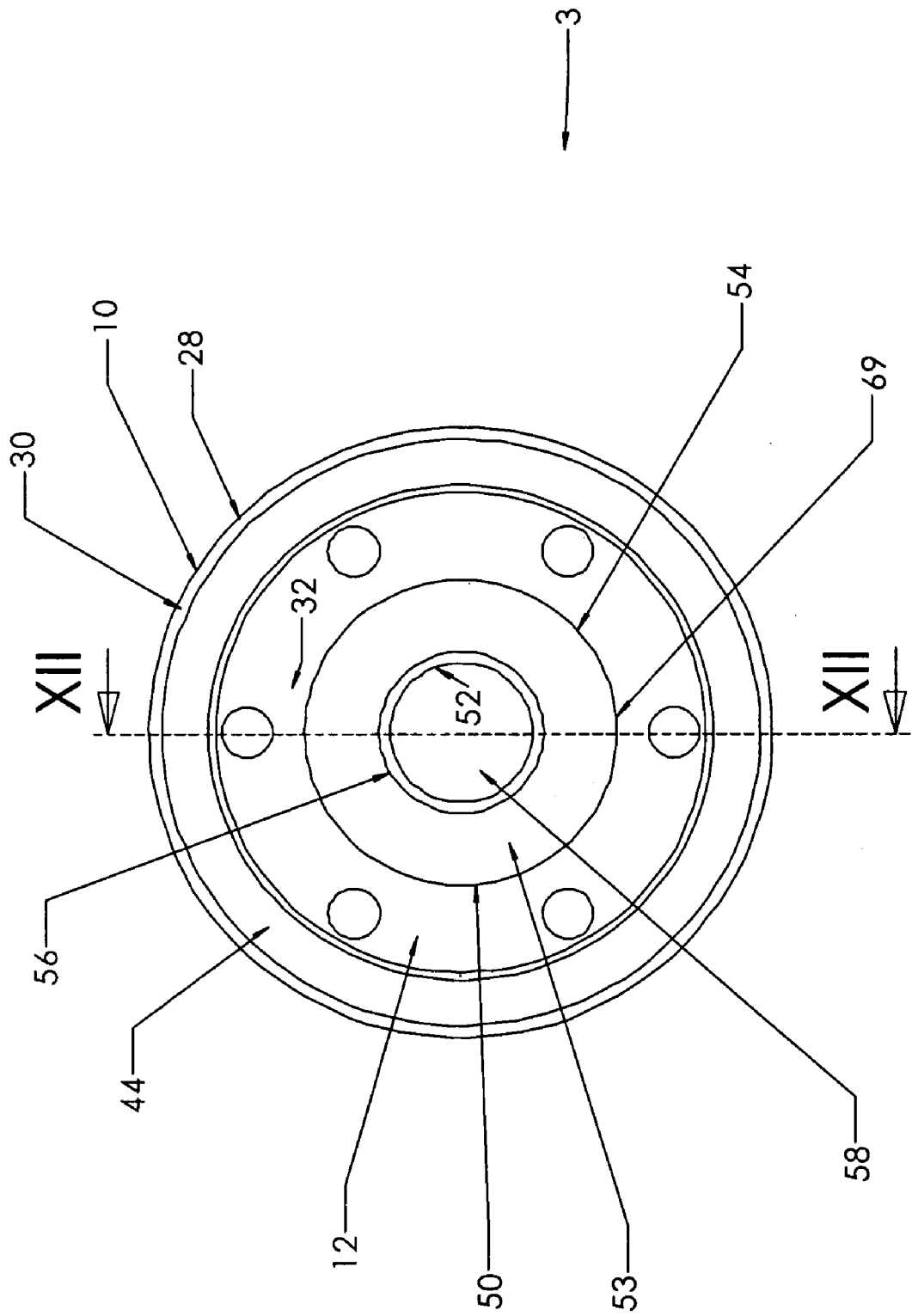
FIG. 11 is a top view of the sixth present preferred embodiment with the body, nuts, washers and fasteners cut away.

As best seen in FIGS. 9 and 10, the cavity 16 of the housing 3 in which a portion of the fastener and the element 60 is housed is defined by the inner surface 26 of the sidewall, the inner surface 22 of the bottom, and the inner surface 18 of the top. The first end 48 of the fastener is housed within the cavity 16 adjacent the element 60 and the inner surface 18 of the top. The middle section 47 of the fastener extends through the hole in the element 62, the second opening 40 of the passageway, the passageway 36, and the first opening 38 of the passageway such that the second end 46 of the fastener is above the second raised upper surface 32 of the outer surface of the top. Element 60 is adjacent to, or in juxtaposition with, the inner surface 18 of the top.

Preferably, the inner surface 26 of the sidewall and the inner surface 18 of the top form a substantially polygonal shape such that an element housed within the cavity 16 must have a substantially polygonal shape to fit within the cavity, as best seen in FIG. 10. The substantially polygonal shape fits within such a cavity and is less likely to rotate or move when nuts or other structures, such as ladders or control panels, are being connected to the fastener or the housing. Cavities having other shapes, however, may also be used.

It should be noted that, by "substantially polygonal," we mean a shape that is mostly defined by straight lines, but may have rounded edges at points where two straight lines intersect each other. An example of an element having such a substantially polygonal shape is partially shown in FIG. 10 and is also shown in FIG. 3. We prefer to use an element having a substantially polygonal shape, but an element having a polygonal shape, a partially circular shape or a circular shape may also be used.

The element 60 distributes force evenly throughout the inner surface of the top 18 and increases the durability of the housing by directly absorbing any forces applied through the first end 48 of the fastener. We prefer that the cavity 16 and element 60 be sized so that a portion of the element is aligned with the compressible resilient member 44 that resides on the first lower surface 30 in juxtaposition with lip 34 such that the element 60 can distribute force evenly against a substantial portion of the top 12 of the housing and also provide support to the top 12 when the housing is compressed against a tank wall. We prefer that the element 60 be made of 304 stainless steel, but the element can also be made of other materials, such as other metals, ceramics, plastics, and alloys.

A washer 90 and nut 80 can also be connected to the fastener, as shown in FIG. 9. Typically, when the third present preferred embodiment is attached to a tank wall, the second end 46 of the fastener will extend beyond the interior of the tank wall into a room in which the tank is housed. The washer 90 and nut 80 will be placed along the middle section 47 of the fastener and tightened until the housing 3 is in tight, frictional contact with the wall of a tank or vessel. The compressible resilient member compresses as the nut and washer are tightened against the tank wall such that a frictional, leak free connection is made between the compressible resilient member 44 and the tank wall. Thus, material held in the interior of the tank is unable to pass through the compressible resilient member 44, the tank wall, or the housing 3 and out of the tank.

The housing 3 can be made of metal, ceramics, plastics or an inert material that will not react with materials likely to be retained by the tank. Preferably the housing is made of polypropylene, polyethylene, polyvinylchloride. The housing may be manufactured using lathes or an injection molding system as known by those skilled in the art.

In fourth, fifth, sixth, seventh, and ninth present preferred embodiments, shown in FIGS. 4-6, 11-17 and 19, the housing can also have at least one channel 56. Such a housing, when installed in or to a tank or vessel wall, will have a part of the channel extend from the wall of the tank to an external area on the outside of the tank so that a pipe, tubing, or other structure may be attached to the channel to extract material residing in the inside of the tank or vessel.

Figure 15:
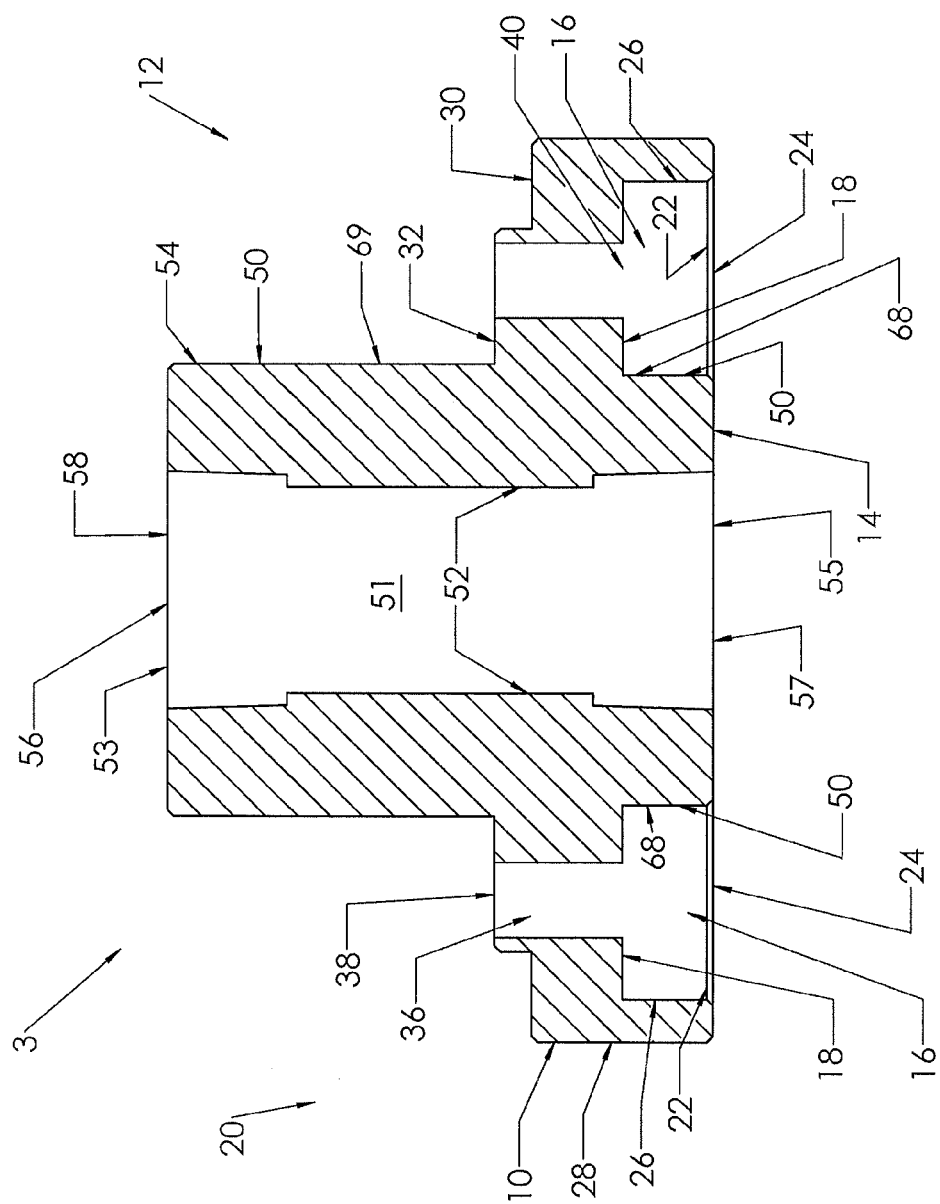
FIG. 15 is a section view of the fourth present preferred embodiment taken along line XV-XV in FIG. 14.

As best seen in FIG. 15, the channel 56 is defined by a wall 54. The wall 54 of the channel has an inner side 52 and an outer side 50. The inner side 52 of the channel wall defines the first end 53, the middle section 51, and the second end 57 of the channel. The channel has a first opening 58, defined by the first end 53 of the housing, and a second opening 55, defined by the second end of the channel 57. A middle section 51 of the channel is disposed between the first opening 58 and the second opening 55 of the channel. The first opening 58 and the first end 53 of the channel lie above the second upper raised surface 32 of the outer surface of the top. The middle section 51 of the channel extends from the first end 53 of the channel through the top 12 of the housing, the cavity 16, and the bottom 14 of the housing. The channel 56 terminates at the second end 57 with the second opening 53 of the channel being through the outer surface 24 of the bottom.

Figure 20:
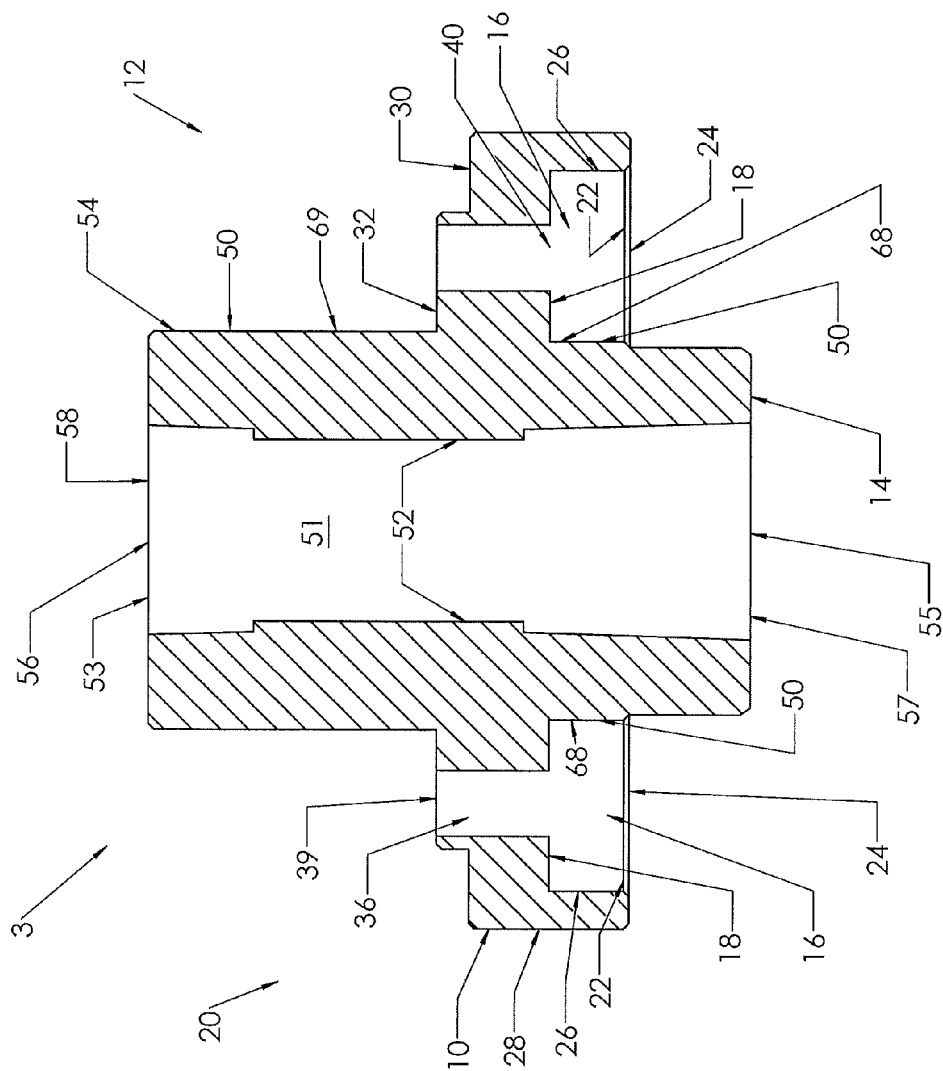
FIG. 20 is sectional view similar to FIG. 15 of an eleventh present preferred embodiment.

A first portion 69 of the outer side of the channel wall extends from the first end 53 of the channel to the inner surface 18 of the top of the housing. A second portion 68 of the outer side of the channel wall extends from the inner surface 18 of the top to the inner surface 22 of the bottom such that the second portion 68 of the outer wall of the channel, the inner surface 18 of the top, the inner surface 22 of the bottom, and the inner surface 26 of the sidewall defines the cavity 16. In embodiments of the invention that have a housing 3 that has only one channel, the cavity may have the shape of a ring such that a ring or circular shaped element 60 can be housed within the cavity 16. It should be understood that the second end 57 of the channel may extend beyond the outer surface 24 of the bottom in other embodiments, similar to the channel 56 shown in FIG. 20.

The channel wall 54 separates the channel 56 from the cavity 16. When the housing 3 is installed in or on a tank wall, the channel permits material retained by the tank to pass through the housing and out of the tank. The channel wall 54 prevents the material passing through the channel 56 from coming into contact with the fasteners 42 enclosed within the cavity 16, which prevents the fasteners from being deformed or corroded by the material passing through the channel.

It should be understood that the housing may have more than one channel in alternative embodiments.

Figure 6:
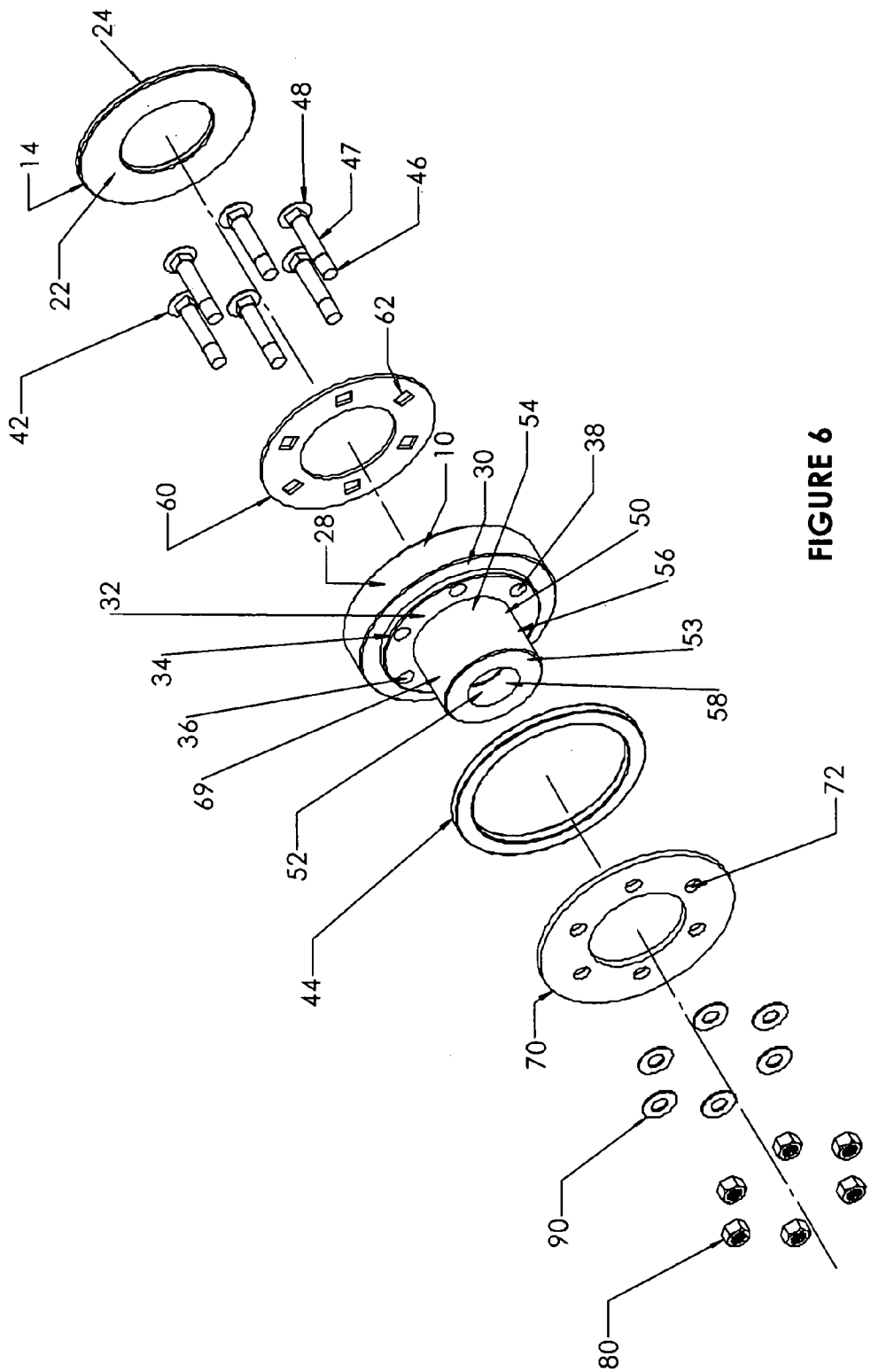
FIG. 6 is an exploded view of a sixth present preferred embodiment.
Figure 12:
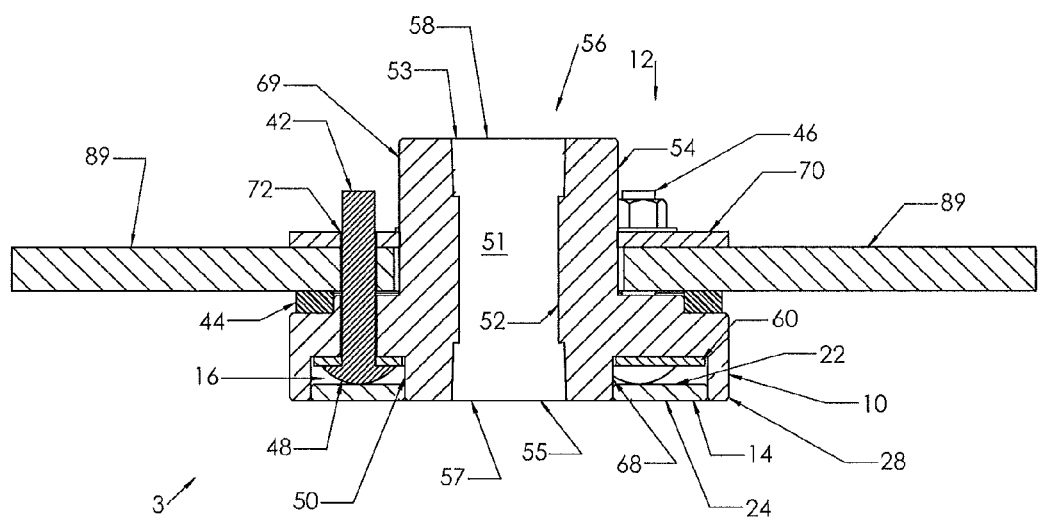
FIG. 12 is a sectional view of the sixth present preferred embodiment along line XII-XII in FIG. 11 attached to a tank wall with a portion of the tank wall, body, top and sidewall cut away to show a fastener with the nuts and washers cut away.
Figure 13:
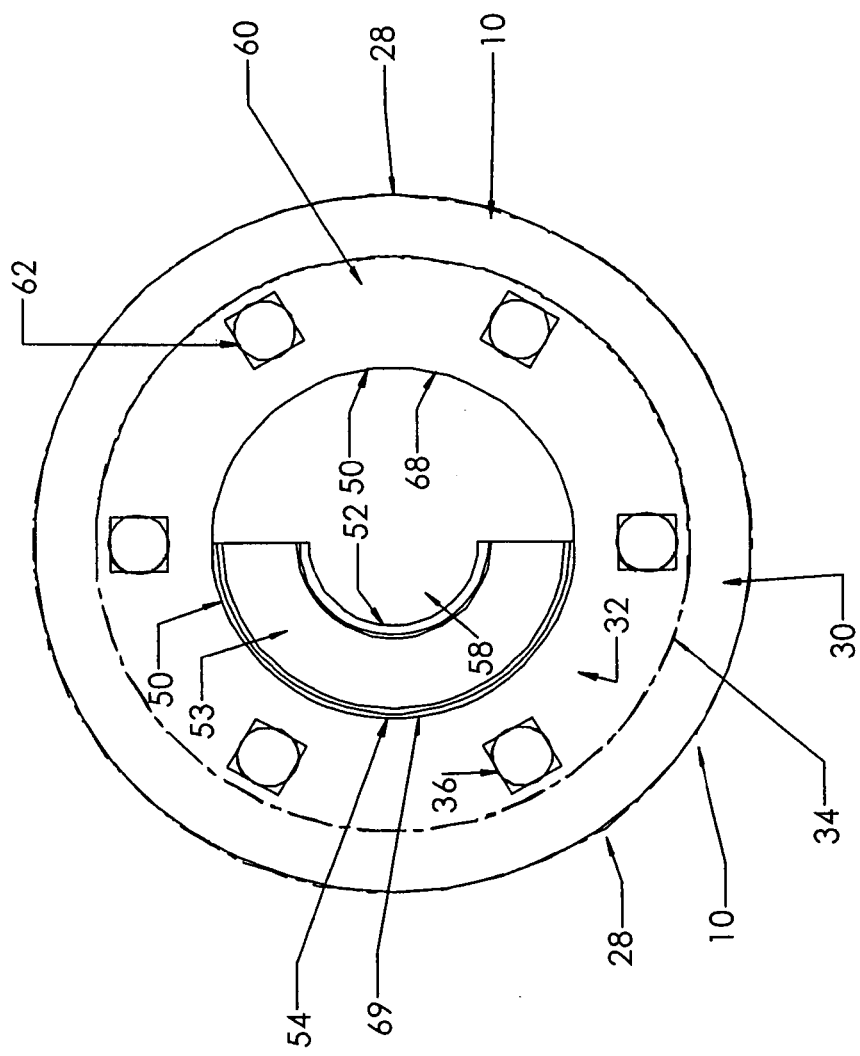
FIG. 13 is a top view of the fifth present preferred embodiment with portions of the top, portions of the channel, the fasteners, and the compressible resilient member cut away to show the element located within the cavity.
Figure 14:
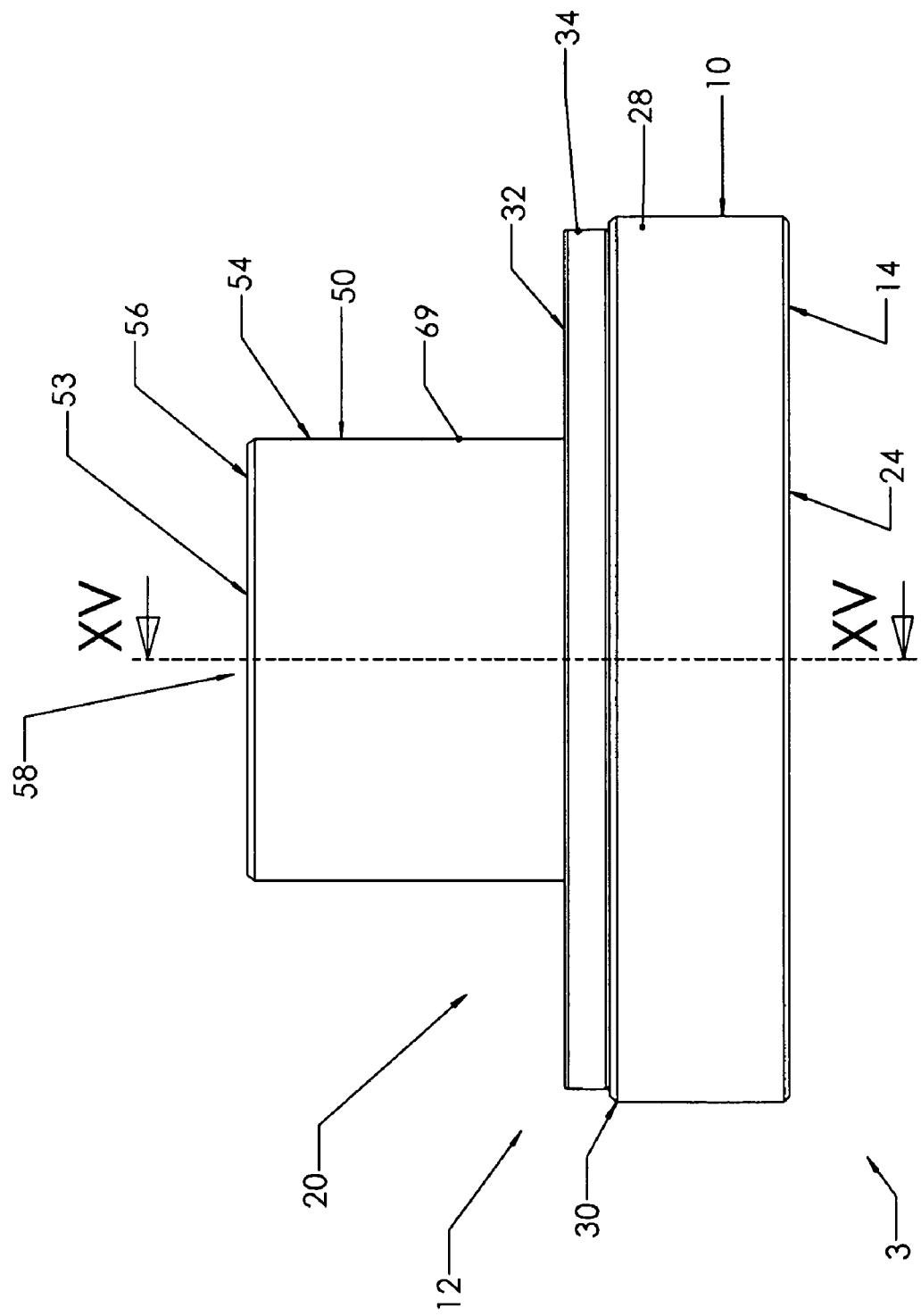
FIG. 14 is a side view of the fourth present preferred embodiment.

As shown in FIGS. 6 and 12, a body 70 can also be provided in a present preferred embodiment of the present invention. Body 70 has at least one hole 72. The holes 72 are sized to permit the middle section 47 and second end 46 of each fastener to pass through the holes. When the housing is attached to a tank wall 89, the body 70 provides additional support by directly absorbing forces applied by the nuts 80, washers 90, and fasteners 42. If the body 70 is not provided, these forces would directly act against the exterior wall of the tank or vessel to which the housing is installed, possibly deforming the tank or vessel wall. The body can be a metal ring, a washer, a metal plate, a ceramic plate, a plastic washer, or other structures known to those skilled in the art.

Figure 16:
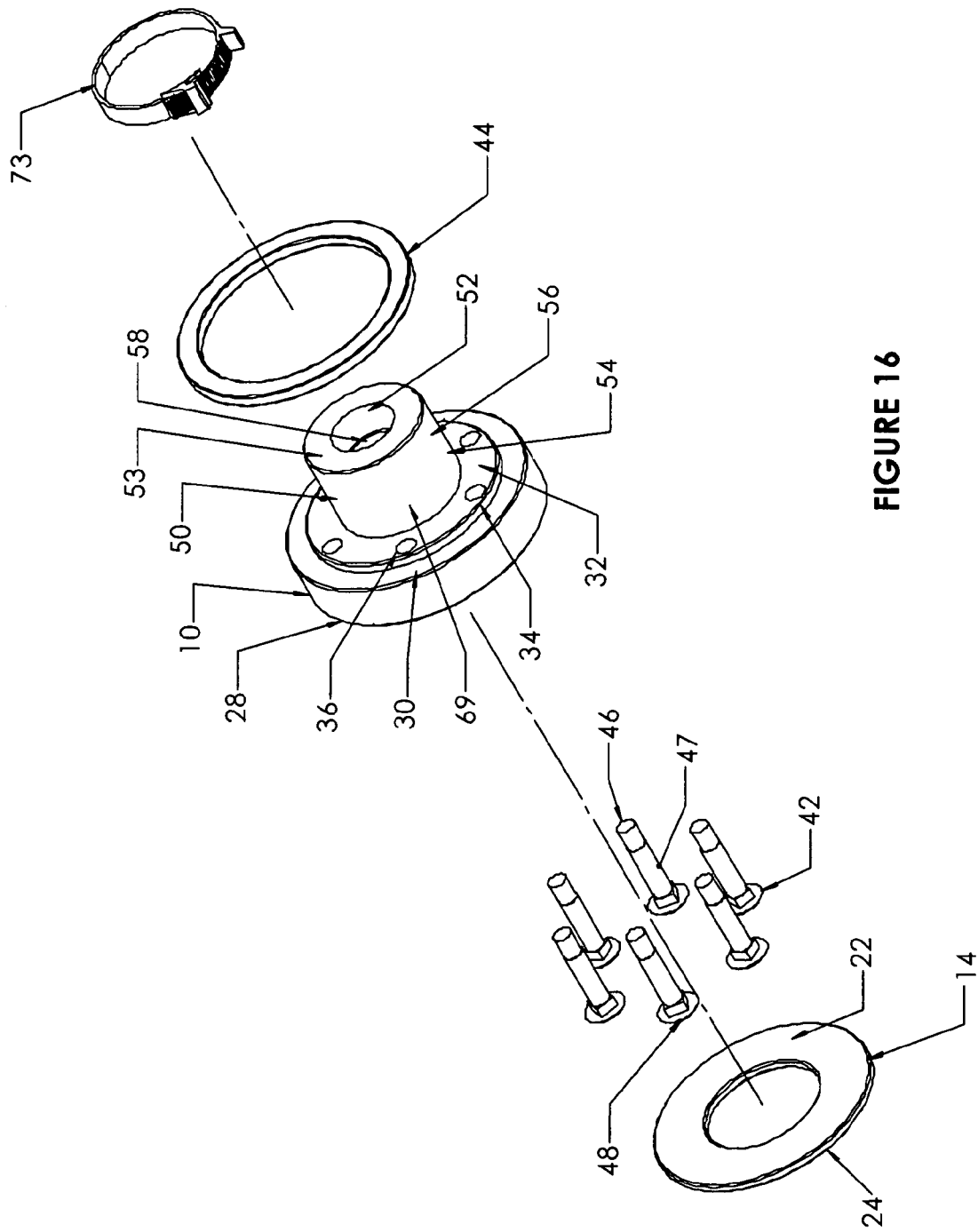
FIG. 16 is an exploded view of a seventh present preferred embodiment.

As shown in FIG. 16, a coupling device 73 can be attached to the channel 56 so that pipes, tubing, or other fittings may be attached to the channel. Preferably, the coupling device 73 is attached to the first end 53 of the channel. The coupling device can also be connected to the second end 57 of the channel. A plurality of coupling devices can also be attached to the housing such that at least one coupling device is attached to the first end 53 of the channel and at least one coupling device is attached to the second end 57 of the channel. The coupling devices 73 may be elastic collars, hose clamps and other coupling devices known to those of skill in the art capable of connecting a tube to the channel 56 or ensuring that a tube stays connected to the channel 56.

Figure 17:
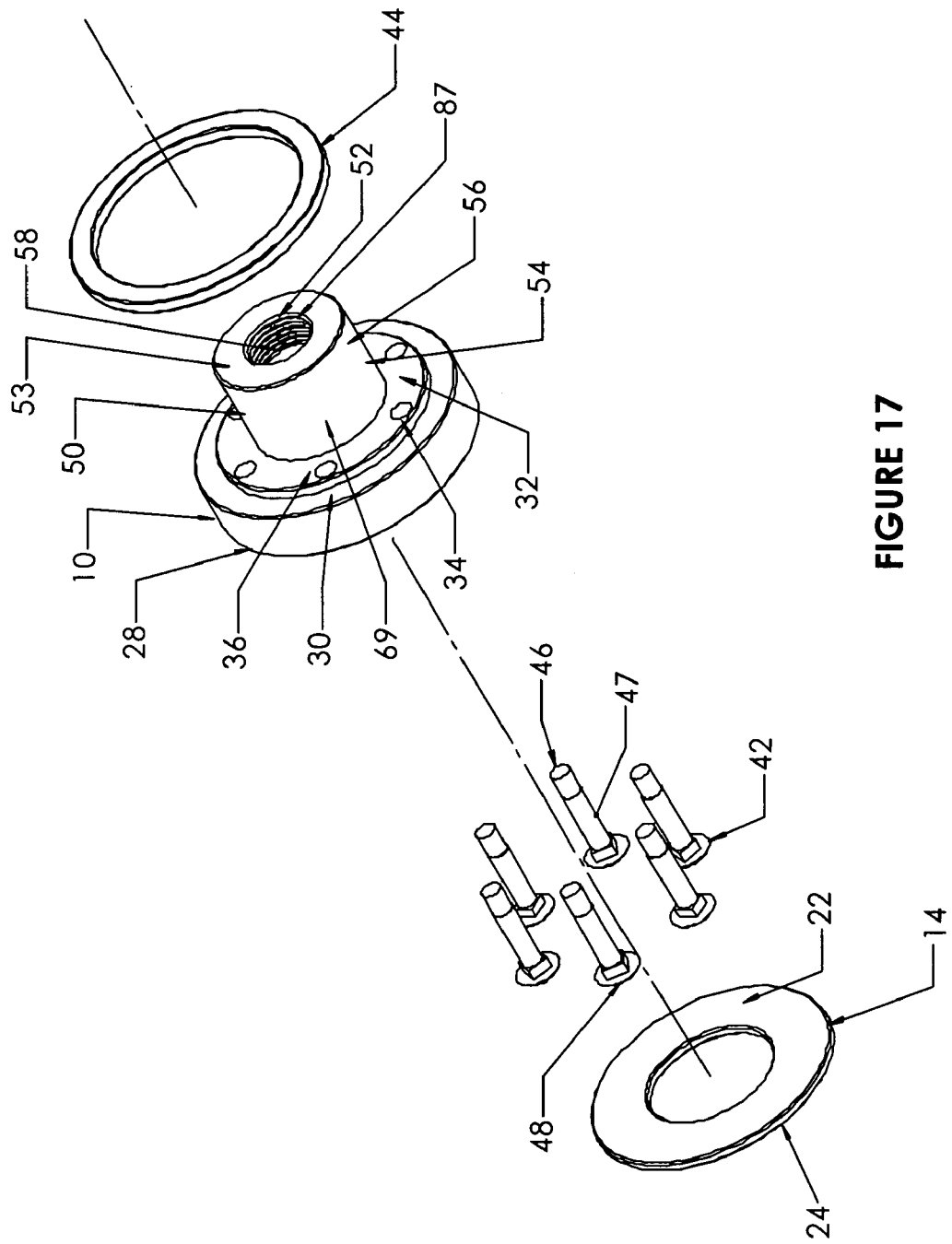
FIG. 17 is an exploded view of an eighth present preferred embodiment.

As shown in FIG. 17, at least one furrow 87 can be defined in the inner side 52 of the wall of the channel. The furrows 87 can be threads or grooves that permit tubing or piping to be seperably connected to the first or second end of the channel. The furrows 87 can also be located on the outer side 50 of the channel wall so that tubing or piping can be seperably connected to the first or second end of the channel.

Figure 18:
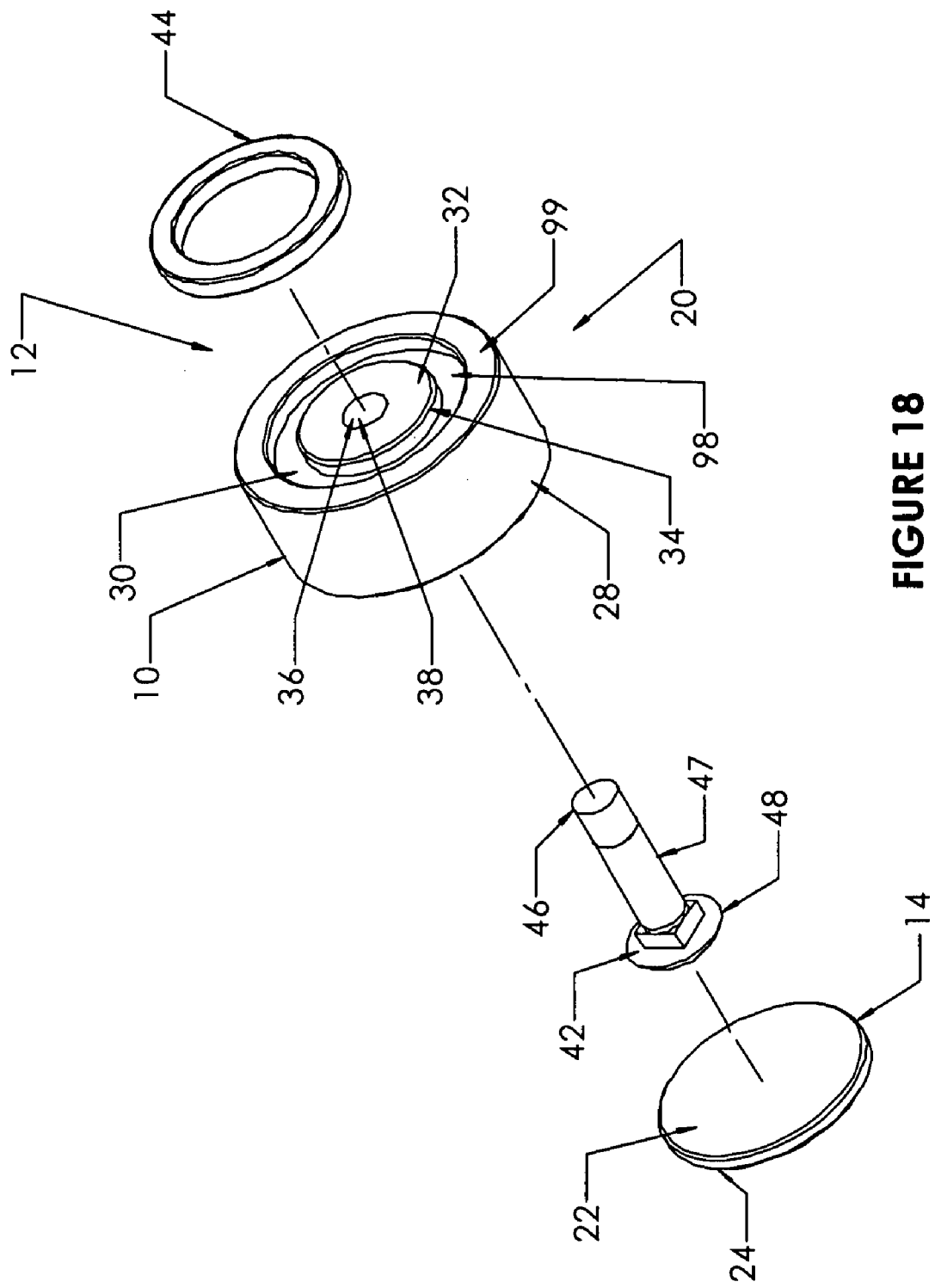
FIG. 18 is an exploded view of a ninth present preferred embodiment.
Figure 19:
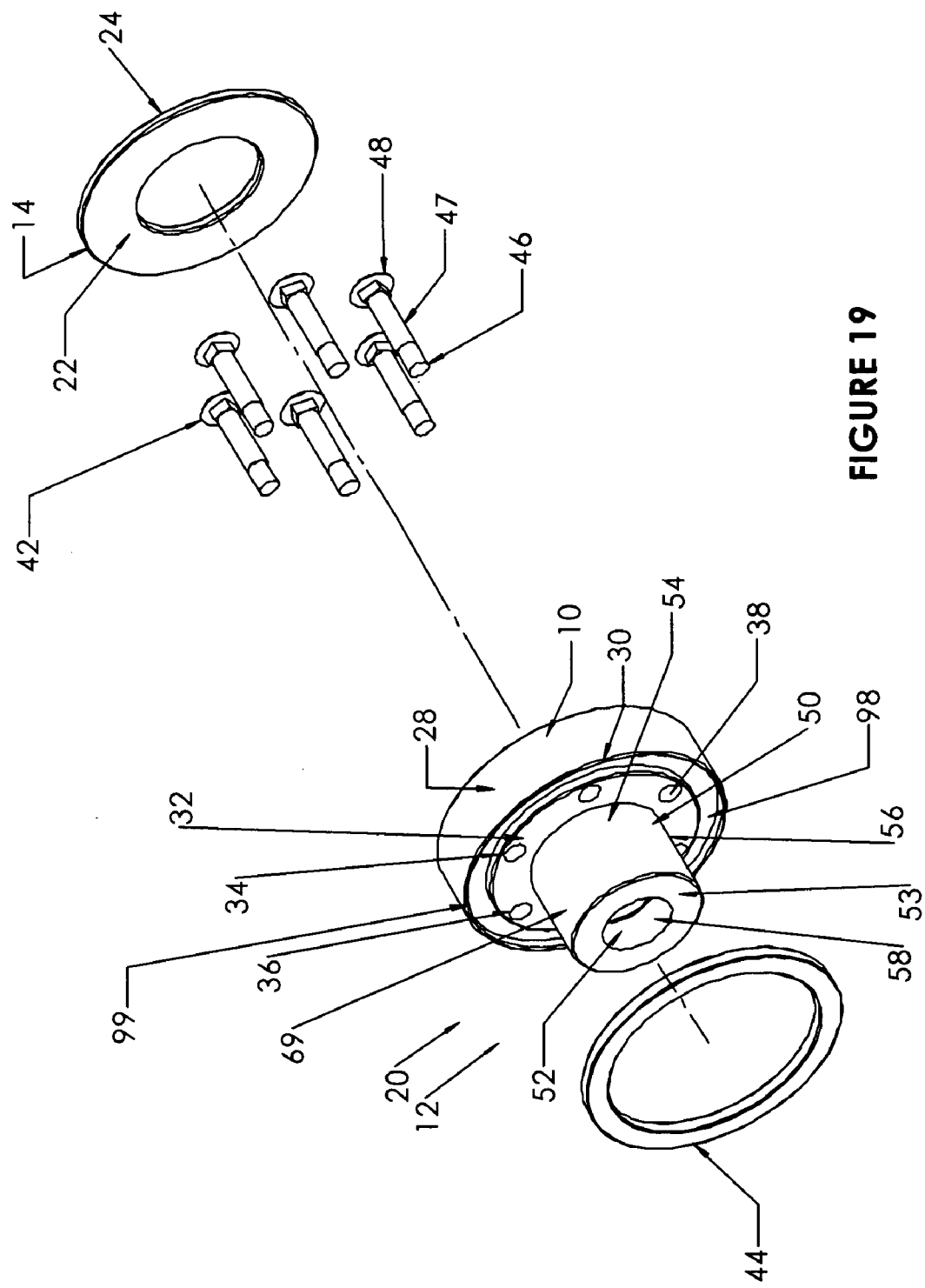
FIG. 19 is an exploded view of a tenth present preferred embodiment.

In eighth and ninth present preferred embodiments, the outer surface 20 of the top has a third wall 99, as shown in FIGS. 18 and 19. The third wall is adjacent to, or in juxtaposition with, the first lower surface 30 and has a perimeter that is greater in size in relationship to the perimeter of the second raised upper surface 32. The third wall 99 extends above the first lower surface 30 such that the third wall 99, first lower surface 30, and second raised upper surface 32 define a groove 98. The groove 98 has a bottom defined by the first lower surface 30 and two sidewalls. One sidewall of the groove 98 being the lip 34 and the other sidewall being the third wall 99. The compressible resilient member 44 is located adjacent to the groove 98, in juxtaposition to the first lower surface 30. At least one sidewall of the compressible resilient member 44 has a height that extends above the third wall 99.

It should be noted that the bottom 14 of the housing can be in sealed engagement with the sidewall 10 of the housing. This sealed engagement can be obtained by welding the bottom to the housing to the sidewall 10 or by other leak free attachment methods known to those skilled in the art. When the housing has at least one channel, as shown in FIG. 19, the bottom may also be welded to the wall 54 of the channel so that the bottom is in sealed engagement with the wall of the channel.

While we have shown and described certain present preferred embodiments of the invention and have illustrated certain present preferred methods of practicing the same, it is to be distinctly understood that the invention is not limited thereto but may be otherwise variously embodied and practiced within the scope of the following claims.

We claim:

1. A tank adapter device comprising:

a housing having a sidewall, a top and a bottom, wherein said sidewall is disposed between said top and said bottom forming a cavity in said housing, said top having an inner surface and an outer surface, said bottom having an inner surface and an outer surface, said sidewall having an inner surface and an outer surface, said inner surface of said top and said inner surface of said bottom and said inner surface of said sidewall defining said cavity within said housing, said outer surface of said top having a first lower surface and a second raised upper surface that is positioned above and in juxtaposition to said first lower surface, said second raised upper surface of said top having a perimeter and said first lower surface of said top having a perimeter, said perimeter of said second raised upper surface of said outer surface of said top being smaller in size in relationship to said perimeter of said first lower surface of said outer surface of said top such that a lip is formed between said first lower surface of said top and said second raised upper surface of said top, said second raised upper surface and said inner surface of said top having at least one continuous passageway extending therebetween, and wherein said passageway has a first opening in operative communication with said second raised upper surface of said outer surface of said top and wherein said passageway has a second opening in operative communication with said inner surface of said top and at least a portion of said cavity, and wherein said first opening and said second opening of said passageway are at opposite ends of said passageway;

at least one fastener having a first end, a second end, and a middle section disposed between said first end and said second end of said fastener, wherein said middle section of said fastener extends through said passageway and through said first opening of said second raised upper surface of said outer surface of said top such that said second end of said fastener protrudes beyond said second raised upper surface of said outer surface of said top and wherein said first end of said fastener is adjacent to said inner surface of said top;

at least one nut which is connected to said fastener; and where there is at least one compressible resilient member in juxtaposition to said lip, said compressible resilient member having at least one sidewall having a height that extends above said second raised upper surface.

2. The tank adapter of claim 1 comprising an element having at least one hole, said element being located within said cavity in juxtaposition to said inner surface of said top such that said at least one hole of said element is aligned with said second opening of said passageway, and wherein said first end of said fastener being in juxtaposition with said hole of said element such that said middle section of said fastener extends through said hole and through said passageway such that said second end of each fastener protrudes beyond said second raised upper surface of said outer surface of said top of said housing.

3. The tank adapter of claim 2, wherein said element is comprised of a material selected from the group consisting of metals, alloys, stainless steel, grade 304 stainless steel, ceramics, and plastics.

4. The tank adapter of claim 2 wherein said element has a circular shape, a polygonal shape or a substantially polygonal shape.

5. The tank adapter of claim 2, wherein said inner surface of said top and said inner surface of said sidewall of said housing define one of a polygonal shape or a substantially polygonal shape, and wherein said element has a shape that allows for an interlocking fit within said polygonal shape or said substantially polygonal shape.

6. The tank adapter of claim 1 further comprising a body, said body having at least one hole, said middle section of said fastener extending through said at least one hole of said body such that said body is aligned with at least a portion of said outer surface of said top of said housing.

7. The tank adapter of claim 1 wherein said compressible resilient member is comprised of a material selected from the group consisting of plastics, foams, elastics, rubber, and silicone rubber.

8. The tank adapter of claim 1 wherein said compressible resilient member is encapsulated in an inert material.

9. The tank adapter of claim 8 wherein said inert material is polytetrafluoroethylene.

10. The tank adapter device of claim 1 comprising at least one channel having a wall, a first opening at a first end of said channel, a second opening at a second end of said channel, and a middle section disposed between said first and second openings of said channel, said wall of said channel having an inner side and an outer side, said inner side of said wall of said channel defining said middle section, said first end and said second end of said channel, wherein said first opening of said channel and said first end of said channel lie above said second raised upper surface of said top, and wherein said middle section of said channel extends from said first end of said channel through said top of said housing, said cavity, said inner surface of said bottom of said housing, and said outer surface of said bottom of said housing to said second end of said channel, and wherein said second end of said channel terminates with said second opening of said channel through said outer surface of said bottom of said housing and wherein a first portion of said outer side of said wall of said channel extends from said first end of said channel to said inner surface of said top and a second portion of said outer side of said wall of said channel extends from said inner surface of said top to said inner surface of said bottom such that said second portion of said outer side of said wall of said channel, said inner surface of said sidewall of said housing, said inner surface of said top and said inner surface of said bottom define said cavity.

11. The tank adapter of claim 10 wherein said second end of said channel is in sealed engagement with said outer surface of said bottom of said housing.

12. The tank adapter of claim 10 wherein said bottom of said housing is in sealed engagement with said sidewall of said housing.

13. The tank adapter of claim 1 wherein said bottom of said housing is in sealed engagement with said sidewall of said housing.

14. The tank adapter of claim 1 wherein said housing is comprised of a material selected from the group consisting of plastics, ceramics, metals, polyvinylchloride, polypropylene, and polyethylene.

* * * * *